(12) United States Patent
Bricklin et al.

(10) Patent No.: US 10,832,185 B1
(45) Date of Patent: Nov. 10, 2020

(54) GOAL OPTIMIZED PROCESS SCHEDULER

(71) Applicant: Wells Fargo Bank, N.A., San Francisco, CA (US)

(72) Inventors: Nathan Craig Bricklin, Walnut Creek, CA (US); Gregory John Hansen, El Dorado Hills, CA (US); Adnan Khan, San Francisco, CA (US); Kathleen E. McGinn, Mill Valley, CA (US); Ryan Benjamin Miller, Petaluma, CA (US); Wairnola Marria Rhodriquez, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 187 days.

(21) Appl. No.: 15/867,081

(22) Filed: Jan. 10, 2018

(51) Int. Cl.
 *G06Q 10/00* (2012.01)
 *G06Q 10/06* (2012.01)
 *G06Q 10/10* (2012.01)

(52) U.S. Cl.
 CPC ... *G06Q 10/06311* (2013.01); *G06Q 10/1093* (2013.01)

(58) Field of Classification Search
 None
 See application file for complete search history.

(56) References Cited

U.S. PATENT DOCUMENTS

| | | | |
|---|---|---|---|
| 5,117,353 A | 5/1992 | Stipanovich et al. | |
| 6,115,693 A * | 9/2000 | McDonough | G06Q 10/06311 705/7.16 |
| 7,236,843 B1 * | 6/2007 | Wizelman | G05B 19/41865 700/100 |
| 7,343,316 B2 | 3/2008 | Goto | |
| 7,702,532 B2 * | 4/2010 | Vigil | G06Q 10/06 705/7.18 |

(Continued)

FOREIGN PATENT DOCUMENTS

WO    WO-0197086 A2    12/2001

OTHER PUBLICATIONS

Martin, Taylor, How to Make a to-do list with Alexa, Oct. 13, 2016, https://www.cnet.com/how-to/how-to-make-a-to-do-list-with-alexa/, p. 1-5.*

(Continued)

*Primary Examiner* — Joseph M Waesco
(74) *Attorney, Agent, or Firm* — Schwegman Lundberg & Woessner, P.A.

(57) ABSTRACT

Systems and techniques for goal optimized process scheduler are described herein. A set of processes may be obtained from a plurality of process engines. Process data may be identified for each member of the set of processes. Goal data may be obtained for a goal. The goal data may indicate elements for attainment of the goal by completion of one or more processes of the set of processes. A process schedule may be generated for the set of processes based on the goal data. The process schedule may be optimized through removal of processes from the process schedule by comparison of the process data to the goal data. The optimized process schedule may include a linear organization of processes for attainment of the goal. An optimized process schedule workflow may be created for display on a user interface of a computing device.

24 Claims, 5 Drawing Sheets

(56) References Cited

U.S. PATENT DOCUMENTS

| | | | |
|---|---|---|---|
| 7,788,143 B2 | 8/2010 | Gindlesperger | |
| 8,015,564 B1* | 9/2011 | Beyer | G06F 9/5066 |
| | | | 718/100 |
| 8,224,472 B1* | 7/2012 | Maluf | G06Q 10/06 |
| | | | 700/97 |
| 8,290,804 B2* | 10/2012 | Gong | G06Q 10/06311 |
| | | | 705/7.13 |
| 8,788,375 B2 | 7/2014 | Podgurny et al. | |
| 10,032,136 B1* | 7/2018 | Hamilton | G06Q 10/1097 |
| 2004/0139426 A1* | 7/2004 | Wu | G06Q 10/10 |
| | | | 717/120 |
| 2005/0039206 A1* | 2/2005 | Opdycke | G06Q 30/0277 |
| | | | 725/35 |
| 2005/0216324 A1* | 9/2005 | Maithell | G06Q 10/06375 |
| | | | 705/7.22 |
| 2005/0257200 A1* | 11/2005 | Taylor | G06F 8/447 |
| | | | 717/136 |
| 2006/0106657 A1* | 5/2006 | Pollak | G06Q 10/10 |
| | | | 705/7.13 |
| 2007/0150330 A1* | 6/2007 | McGoveran | G06Q 30/0201 |
| | | | 705/7.13 |
| 2007/0250370 A1 | 10/2007 | Partridge et al. | |
| 2008/0046305 A1 | 2/2008 | Garcia et al. | |
| 2009/0276255 A1* | 11/2009 | Bhatt | G06Q 10/06 |
| | | | 705/7.23 |
| 2011/0016483 A1* | 1/2011 | Opdycke | H04N 21/26258 |
| | | | 725/14 |
| 2011/0173038 A1* | 7/2011 | Moon | G06Q 10/0631 |
| | | | 705/7.12 |
| 2011/0173626 A1* | 7/2011 | Chi | G06F 9/5072 |
| | | | 718/103 |
| 2011/0246994 A1* | 10/2011 | Kimbrel | G06Q 10/06 |
| | | | 718/102 |
| 2011/0252427 A1* | 10/2011 | Olston | G06F 16/951 |
| | | | 718/102 |
| 2012/0116892 A1* | 5/2012 | Opdycke | H04N 21/44218 |
| | | | 705/14.69 |
| 2012/0239451 A1* | 9/2012 | Caligor | G06Q 10/00 |
| | | | 705/7.21 |
| 2014/0067455 A1* | 3/2014 | Zhang | G06Q 10/109 |
| | | | 705/7.24 |
| 2014/0229955 A1* | 8/2014 | Holmes | G06F 9/4881 |
| | | | 718/102 |
| 2014/0317085 A1* | 10/2014 | Wehrmeister | G06F 16/24544 |
| | | | 707/714 |
| 2014/0317088 A1* | 10/2014 | Al-Omari | G06F 16/24544 |
| | | | 707/718 |
| 2015/0032722 A1* | 1/2015 | Al-Omari | G06F 16/24542 |
| | | | 707/718 |
| 2015/0081326 A1* | 3/2015 | Krishnapuram | G06Q 10/06311 |
| | | | 705/2 |
| 2015/0081498 A1 | 3/2015 | Caldwell et al. | |
| 2016/0341752 A1* | 11/2016 | Holmes | G01N 35/0092 |
| 2016/0364679 A1 | 12/2016 | Cao | |
| 2017/0124596 A1* | 5/2017 | Wang | G06Q 30/0269 |
| 2017/0337492 A1* | 11/2017 | Chen | G06Q 10/06316 |
| 2018/0308068 A1* | 10/2018 | Hamilton | G06Q 10/04 |
| 2018/0321975 A1* | 11/2018 | Bahramshahry | G06F 9/5027 |
| 2018/0321979 A1* | 11/2018 | Bahramshahry | G06F 9/505 |
| 2018/0322442 A1* | 11/2018 | Gupta | G06Q 10/063112 |
| 2018/0365243 A1* | 12/2018 | Guttmann | H04L 63/102 |
| 2019/0130330 A1* | 5/2019 | Slagle | G06Q 10/063114 |

OTHER PUBLICATIONS

Donovan, Sarah A., et al., "What Does the Gig Economy Mean for Workers?", Congressional Research Service, Washington, DC., (Feb. 5, 2016), 20 pgs.

Hannák, Anikó, et al., "Bias in Online freelance marketplaces: Evidence from TaskRabbit and Fiverr", Proceedings of the ACM Conference on Computer Supported Cooperative Work, CSCW, p. 1914-1933, Feb. 25, 2017, (2017), 20 pgs.

* cited by examiner

GOAL OPTIMIZED PROCESS SCHEDULER

TECHNICAL FIELD

Embodiments described herein generally relate to process scheduling and, in some embodiments, more specifically to goal optimized process scheduling.

BACKGROUND

A process scheduler may define an order in which a set of processes may be completed. There may be more processes to be processed than may be completed. Some processes may be time specific and processing of one process may prevent processing of another process. Processes may be prioritized to determine which processes to accept for processing and in what order the processes may be processed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The increasing prevalence of short-term or task based freelance work has been fueled by technological advances making it easier for people looking for jobs to be connected with those looking for help. For example, mobile applications for facilitating ride-sharing, personal shopping, personal services, etc. have made it possible for people to complete short-term jobs close to them at a moment's notice. Some people may earn a majority of their money by going from short-term job (e.g., gig) to short-term job. This gig economy may allow a person the flexibility to work on their schedule and take jobs they may find interesting. The person may have a goal (e.g., a financial goal, etc.) that they may be trying to accomplish through completion of gigs. However, it may not be apparent to the person which gig or combination of gigs may provide the most efficient and effective attainment of the goal. For example, the person may take ride-sharing gigs during rush hour, but because of traffic levels, it may be more efficient to take a personal service gig that may be completed over rush hour because it would result in more revenue.

The techniques discussed herein address the process selection and scheduling challenges presented by the gig economy by identifying a goal of a user, selecting job processes, and optimizing the scheduling of the selected job processes in a way that maximizes progress toward the goal. The job processes may be obtained from one or more job process engines (e.g., ride-sharing service application, personal services application, delivery service application, etc.). The user may be provided with a detailed itinerary of jobs to be completed to attain the goal. The itinerary may include the time the job is expected to take, how much the job pays, and alternative jobs that may be selected. The itinerary may be presented to a mobile-device of the user and selecting a task may initiate the process with its respective job process engine. For example, the user may select a ride-sharing job from the itinerary and it may activate the availability of the user on a ride-sharing service application or may accept a ride job currently available. Thus, the user may be provided with a central location for managing job processes in addition to the automated selection and prioritization of jobs.

Figure 1:
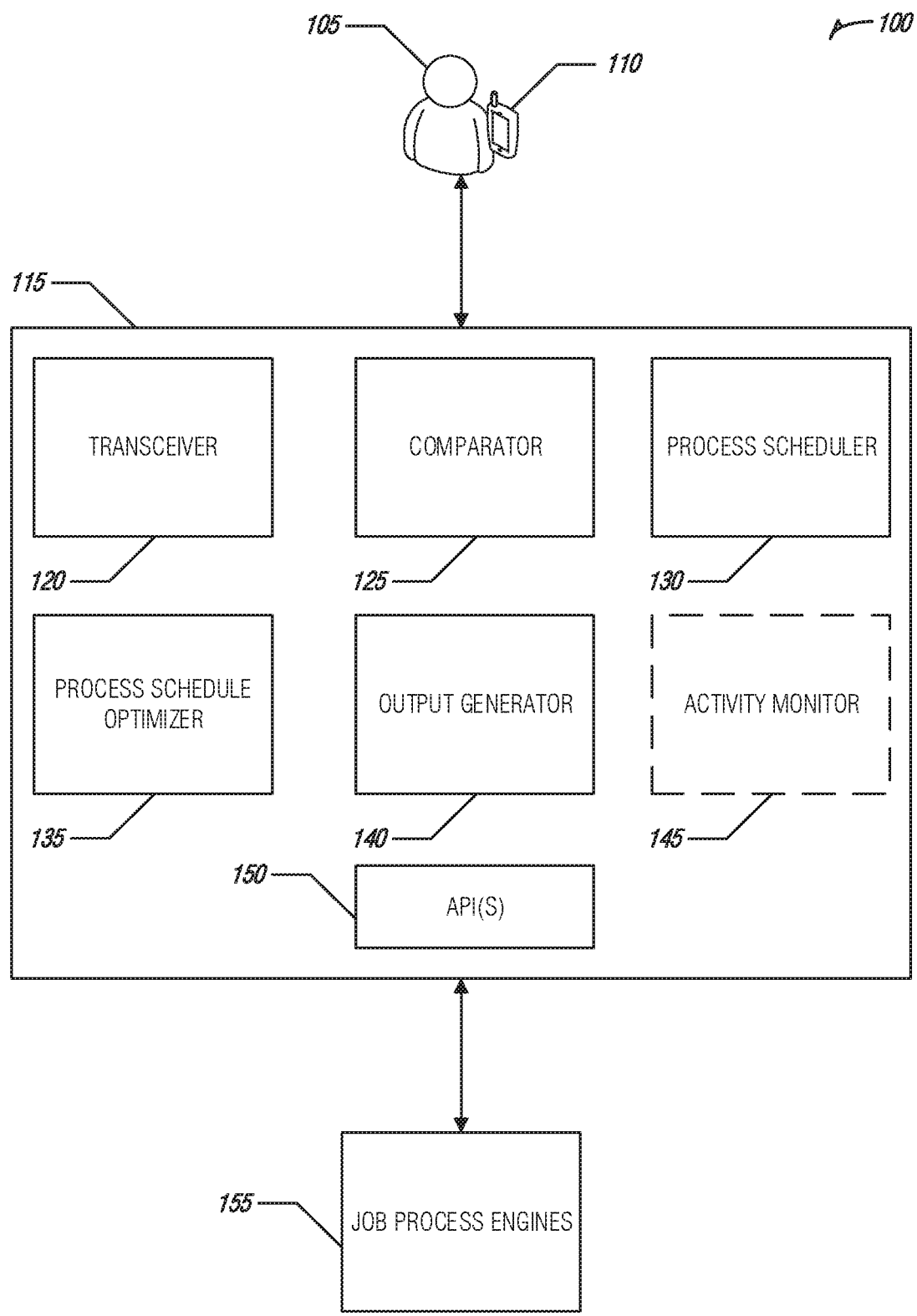
FIG. 1 is a block diagram of an example of an environment and a system for a goal optimized process scheduler, according to an embodiment.

FIG. 1 is a block diagram of an example of an environment 100 and a system 115 for a goal optimized process scheduler, according to an embodiment. The environment 100 may include a user 105 that may be using a device 110 (e.g., mobile device, smartphone, tablet etc.). The device 110 may be communicatively coupled to the system 115 (e.g., via wired network, wireless network, cellular network, shared bus, etc.). The system 115 may include a transceiver 120, a comparator 125, a process scheduler 130, a process schedule optimizer 135, an output generator 140, an activity monitor 145, and APIs 150. The system 115 may be communicatively coupled to job process engines 155 (e.g., ride-sharing service, delivery service, etc.).

The user 105 may be a user of the job process engines 155. For example, the user 105 may have driver account on a ride-sharing service and may have a service provider account on a personal services portal included in the job process engines 155. The job process engines 155 may connect the user 105 with other users that may be looking to have job processes completed. For example, another user may schedule a ride with the ride-sharing service and the request may be routed to the device 110 for acceptance by the user 105.

The transceiver 120 may provide data ingress and egress services for the system 115. The transceiver may receive inputs from and transmit outputs to the device 110 such as, for example, audio, video, touchscreen activations, user interface display data, etc. In another example, the transceiver 120 may transmit data to and receive data from the job process engines 155. The transceiver 120 may transfer received data to other components of the system 115 for processing and may receive data transferred by other components of the system 115 for transmission outside the system 115.

The API(s) 150 may provide connectivity and interoperability between the system 115 and external entities such as the device 110 and the job engines 155. The API(s) 150 may include instructions for connecting to the job process engines 155 using respective user accounts of the user 105. For example, the user 105 may provide user account information for the ride-sharing service and the API(s) 150 may use the user account information to automatically establish a connection to an account for the user 105 on the ride-sharing service. The API(s) 150 may include instructions for translating data elements between the external entities and the system 115. For example, the ride-sharing service may request a particular date format and the API(s) 150 may translate a date transmitted by the system in one format to the particular format requested by the ride-sharing service.

The API(s) 150 may work in conjunction with the transceiver 120 to obtain a set of processes from the job process engines 155. For example, a list of available personal service jobs may be obtained from the personal service portal and a list of ride-sharing opportunities may be obtained from the ride-sharing service. Process data may be identified for each member of the set of processes from the job process engines 155. In an example, a process completion value may be obtained for a process. The process completion value may describe a monetary value awarded for completion of the process, a benefit conferred by completion of the task, or other indicia indicating an outcome achieved by completion of the process. For example, a moving job process obtained from the personal service portal may include data indicating $150.00 may be earned by the user 105 upon completion.

In another example, a process completion location may be obtained for the processes. For example, geolocation data of another user submitting the process or an address information entered by the other user may be provided along with the process. For example, the moving job process may be indicated as being located at 1234 Main Street.

In an example, pattern information may be obtained from the job process engines 155 that may indicate special circumstances for completing a process. For example, the ride-sharing service may indicate that ride jobs completed during a particular time period (e.g., 1 am to 4 am, on December 31, etc.) may result in higher earning that during other periods (e.g., a ride job may pay $6.00 on December 31 that may pay $4.00 on January 3, etc.). The special circumstances may include traffic patterns, demand variability, periods of worker shortages, etc.

In another example, a user activity of the user 105 of the device 110 may be identified from the job process engines 155 or other data systems (not shown) such as, for example, a financial transaction database, etc. The user activity may indicate characteristics of the user 105 such as work history, spending habits, etc.

Goal data for a goal established for (or by) the user 105 may be obtained from the device 110 by the transceiver 120. The goal data may include elements for attaining the goal by completion of one or more processes of the set of processes. For example, a user 105 may have a goal of saving for a down payment for a home purchase which may include an element identifying a total amount needed of $10,000. The user 105 may have $5,000 in a savings account so the amount remaining to be saved may be $5,000. In the example, the element for attaining the goal is earning the remaining $5,000. In another example, a user may have a goal for a day or another period of time, such as an amount of money, the user would like to make in the period of time. A goal may be non-financial. E.g., the user may have a goal to complete a particular gig to, e.g., gain experience or build a resume.

The process scheduler 130 may generate a processes schedule for the set of processes. The set of processes may be arranged in the process schedule according to time periods in which they may be completed. For example, requestor of the moving job process may have requested that the process be completed between 4 pm and 7 pm. Thus, the process schedule may arrange the set of processes in part based on a time period in which members of the set of processes are to be completed. Some processes may be completed during designated time periods and some processes may be mutually exclusive (e.g., only one processes of a group may be completed for the time period, etc.). For example, the user 105 may not be able to complete a ride-sharing job process while completing the moving job process. The process scheduler 130 may include the overlapping processes in the generated process schedule. The process schedule may be generated based on work hours designated by the user 105 (e.g., 9 am to 5 pm, etc.) or based on user availability (e.g., as determined based on an evaluation of calendar entries in a calendaring application of the user 105, etc.). In an example, the process schedule may schedule processes for twenty-four hours in a day.

The process schedule optimizer 135 may optimize the process schedule by removing processes from the process schedule by working with the comparator 125 to compare the processes data to the goal data. For example, two process may be mutually exclusive for a period of time in the process schedule and the comparator 125 may determine which of the two processes is provides the most progress towards the goal and may remove the other process from the process schedule. The optimized process schedule may include a linear organization of processes for attaining the goal. The linear organization of the processes may represent an ordered list of processes that should be completed by the user 105 to work towards attainment of the goal.

The comparator 125 may compare the process data for the members of the set of processes against the goal data to determine a subset of the set of processes that may most effective in attaining progress towards the goal. In an example, a goal value may be determined for the goal using the goal data. For example, the user 105 may have a goal of earning $5,000 remaining for the down payment on the home purchase and $5,000 may be the goal value. In an example, the process completion value may be identified for members of the set of processes using the process data and the process schedule optimizer 135 may optimize the process schedule based on an evaluation, by the comparator 125, of the process completion values to the goal value.

For example, the process data may indicate that ride-sharing job process may pay $25 per hour between 10 am and 11 am and may pay $10 per hour between 7 am and 9 am. The process data may also indicate that a moving job process to be completed from 7 am and 9 am may pay $50 per hour. The comparator 125 may determine that the rider-sharing job process between 7 am and 9 am results in less pay over the time period and, because the user 105 may only complete one of the job processes for the time period, the process schedule optimizer 135 may remove the ride-sharing job process for 7 am to 9 am from the process schedule. Thus, the process schedule may be optimized to maximize revenue for the user 105.

In an example, the process schedule optimizer 135 may work in conjunction with the comparator 125 to identify a process location for a member of the set of process and may optimize the process schedule by evaluating the process locations of the member. The process location may be used to optimize the process schedule to provide an efficient (e.g., least time, least fuel, least downtime, etc.) workflow path for the processes. The locations of the process may be evaluated in conjunction with scheduling information of the user 105 (e.g., data from a calendaring application, etc.) to optimize the process schedule around the planned activity of the user 105.

For example, a calendar entry for the user 105 may indicate the user is going to be in a city forty-five miles from home for a concert and the process schedule optimizer 135 may request the process scheduler 130 find processes near that location before and after the concert. The process schedule optimizer 135 may then schedule job processes between the home of the user and the location of the concert before and after the concert. For example, a ride-sharing job process may be identified leaving from the home city of the user and the location of the concert and the process may remain on the optimized process schedule while a ride-sharing job process in the home city of the user 105 may be removed from the process schedule. Thus, the process schedule may be optimized around the time and place of the expected movements of the user 105.

In an example, the comparator 125 may identify a pattern for a member of the plurality of the job process engines 155. The pattern may be identified from the process data identified for processes for the account of the user 105 or may be identified by evaluating process data across users of the system 115 collected from processes of the member of the job process engine 155. For example, process data for incoming ride-sharing job processes across user accounts of the system 115 may be evaluated to identify the pattern. In some examples, the comparator 125 may use machine learning techniques (e.g., linear regression, neural networks, etc.) to identify patterns in the process data. For example, the comparator 125 may identify the ride-sharing job process pay 25% more on a national holiday than they do on a regular business day. The comparator 125 may evaluate the effects of the identified pattern against the goal data and may assign a weight to a process of the set of processes corresponding to the job process engine 155 from which the process and the pattern was obtained.

The weighting value may be used by the process schedule optimizer 135 to prioritize processes that are weighted higher and may provide more efficient progress toward the goal. For example, a first ride-sharing job process from a first ride-sharing service may be removed while a second ride-sharing job process may be allowed to remain for a time period based on the second rid-sharing job process having a higher weight value than the first ride-sharing job process. The higher weighting may be the result of an identified pattern of the second ride-sharing service paying a higher rate for the time period than the first ride-sharing service. In an example, the weight may be based on user enjoyment (e.g., user preferences, preferred job types, etc.) For example, a lower paying gig with more enjoyment (e.g., a higher user preference, etc.) may be prioritized over a higher paying one that is not as enjoyable (e.g., having a lower user preference, etc.). The preferences may be stored in a user profile and may be accessed when evaluating the process schedule.

In an example, a user activity of the user 105 of the computing device 110 may be identified by the activity monitor 145 and the process schedule optimizer 135 may optimize the process schedule based on an evaluation, by the comparator 125, of the user activity against the goal value. The activity monitor 145 may be authorized by the user 105 to access a variety of data sources (e.g., financial records, social media accounts, etc.) that may include indications of user activity. For example, it may be identified that the user 105 spent $1,000 on a television and now the goal value is $6,000. The process schedule optimizer 135 may expand the size (e.g., working hours in a day, weekend changes from non-working day to working day, etc.) of the optimized process schedule based on the evaluation. For example, prior to the user activity the process schedule optimizer 135 may have optimized a process schedule for eight working hours a day and, with the purchase of the television, may optimize the process schedule for twelve working hours a day. Thus, the process schedule optimizer 135 may adjust for actions of the user 105 while prioritizing the goal.

The output generator 140 may create an optimized process schedule workflow for display on the device 110 (or on another device using audio, text, etc.). For example, the optimized process schedule may be used to generate a graphical representation of the corresponding processes in an order in which they are to be completed. In an example, the optimized process workflow may be output as audio to be emitted from a speaker of the device 110. The output generator 140 may output the optimized process schedule workflow in a user interface of the device 110. In an example, the optimized process schedule workflow may include instructions for initiating a selected process with its respective job process engine 155 upon selection of a user interface element corresponding to the selected process. For example, the user 105 may tap a ride-sharing job process displayed in the user interface and the ride-sharing job process may be initiated by opening and activating an application for the corresponding ride-sharing job process installed on the device 110. In an example, the optimized process schedule workflow may be overlaid on a map and a route may be generated and displayed providing an indication of a geographical order for completing the processes.

In an example, the comparator 125 may evaluate a set of optimized process schedules including the optimized process schedule to identify a common period of reduced process activity. For example, the comparator 125 may identify that process scheduling for a period of time between 1 pm and 3 pm Monday through Friday has a lower volume of scheduled processes compared to other time periods Monday through Friday. An indication of the period of reduced process activity may be transmitted to a computing device (e.g., device 110) of a user (e.g., user 105). For example, the user may be sent an indication that personal errands should be scheduled between 1 pm and 3 pm Monday through Friday because of reduced process activity. In an example, the indication may be transmitted to a third-party application. For example, a dental appointment scheduling application may receive an indication that users of the system 115 are less likely to be preforming job processes between 1 pm and 3 pm Monday through Friday. The dental appointment scheduling application may indicate to a user that they should increase appointment capacity or advertise availability of appointments during the period. Thus, periods of low process activity towards the goal may be identified and used to complete activities that may otherwise interfere with goal-based process completion.

The optimized process schedule may be updated as processes are completed and as processes are added to the set of processes. In an example, progress towards completing a current process may be identified by the activity monitor 140. An indication of a new process may be received from a process engine of the plurality of process engines (e.g., the job process engines 155). The process schedule may be re-optimized by the process schedule optimizer 135 upon a determination, based on evaluation of process data for the new process and the goal data by the comparator 125, that the new process is a better fit for attaining the goal than an existing process remaining in the linear organization of processes remaining to be completed. A re-optimized process schedule workflow may be displayed in the user interface based on the re-optimized process schedule.

For example, the user 105 may be in the middle of completing a ride-sharing job process and the next process in the optimized process schedule workflow may be a moving job process. However, a new grocery delivery job process may have been received that may have a higher pay rate than the moving job process to be completed at the same time. The moving job process may be removed from the process schedule and the new optimized process schedule may include the grocery delivery job process. The other reaming processes may be revaluated and optimized based on process schedule impacts by the new grocery delivery job process. Thus, the process schedule may be continually optimized in near-real time as processes are completed and received.

Figure 2:
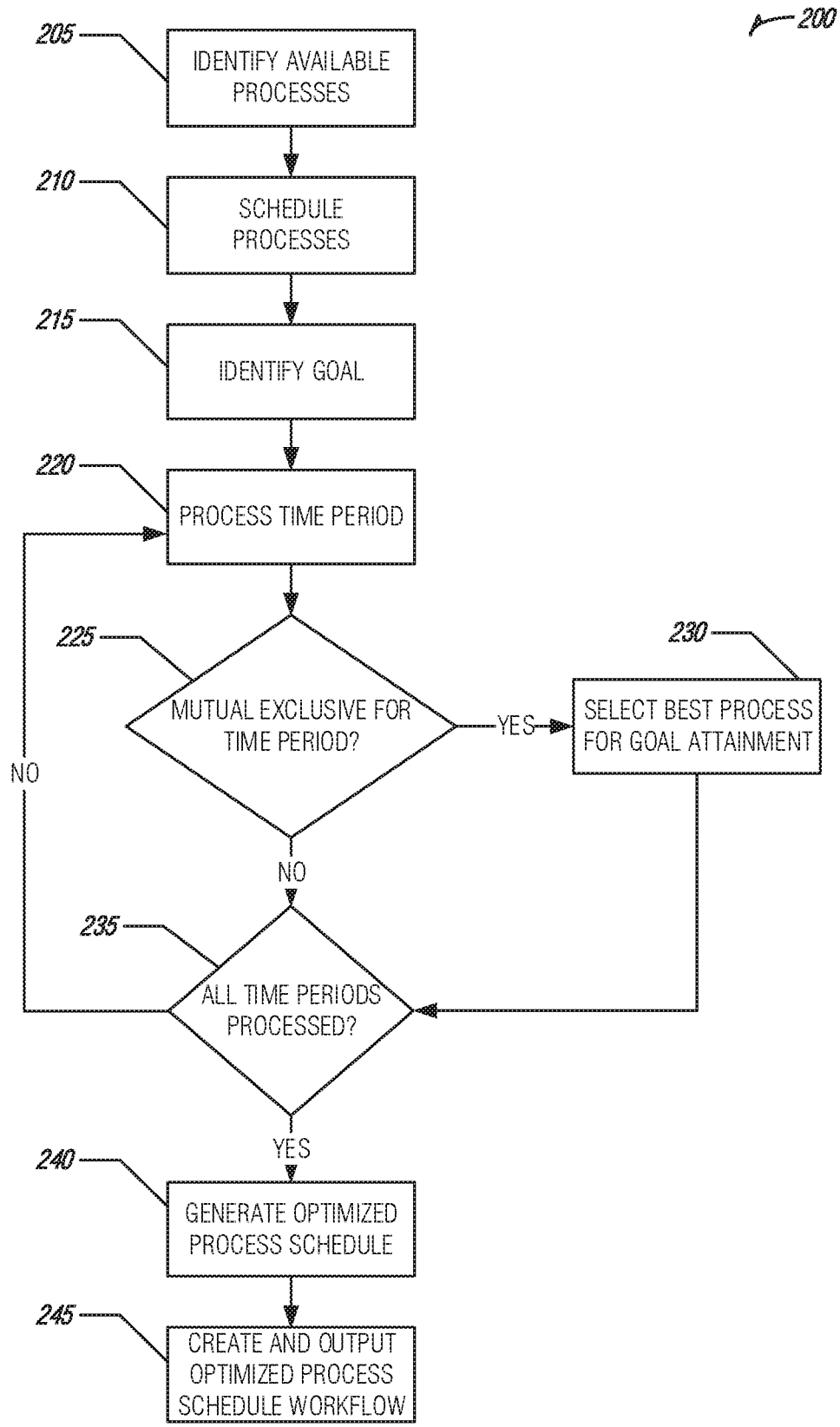
FIG. 2 illustrates a flow diagram of an example of a process for a goal optimized process scheduler, according to an embodiment.

FIG. 2 illustrates a flow diagram of an example of a process 200 for a goal optimized process scheduler, according to an embodiment. The process 200 may provide features as described in FIG. 1.

The process 200 may begin by identifying (e.g., by the process scheduler 130 as described in FIG. 1, etc.) available processes (e.g., tasks, jobs, etc.) from a plurality of job process engines (e.g., job process engines 155 as described in FIG. 1, etc.) at operation 205. The processes may be scheduled (e.g., by the process scheduler 130 as described in FIG. 1, etc.) at operation 210. A goal may be identified (e.g., by the comparator 125 as described in FIG. 1, etc.) at operation 215.

A time period of the process schedule may be processed (e.g., by the process schedule optimizer 135 as described in FIG. 1, etc.) at operation 220. It may be determined (e.g., by the process schedule optimizer 135 as described in FIG. 1, etc.) whether there are mutually exclusive processes for the time period at decision 225. If so, the processes may be compared to the goal (e.g., by the comparator 125 as described in FIG. 1, etc.) to determine and selected the best process for goal attainment at operation 230. The process 200 continues processing time periods at operation 220.

After all the time periods have been processed as determined at decision 235 an optimized process schedule may be generated (e.g., by the process schedule optimizer 135 as described in FIG. 1 using evaluations of the comparator 125 as described in FIG. 1, etc.) at operation 240. An optimized process schedule workflow may be created (e.g., by the output generator 140, etc.) and output (e.g., using the transceiver 120 as described in FIG. 1, etc.) at operation 245.

Figure 3:
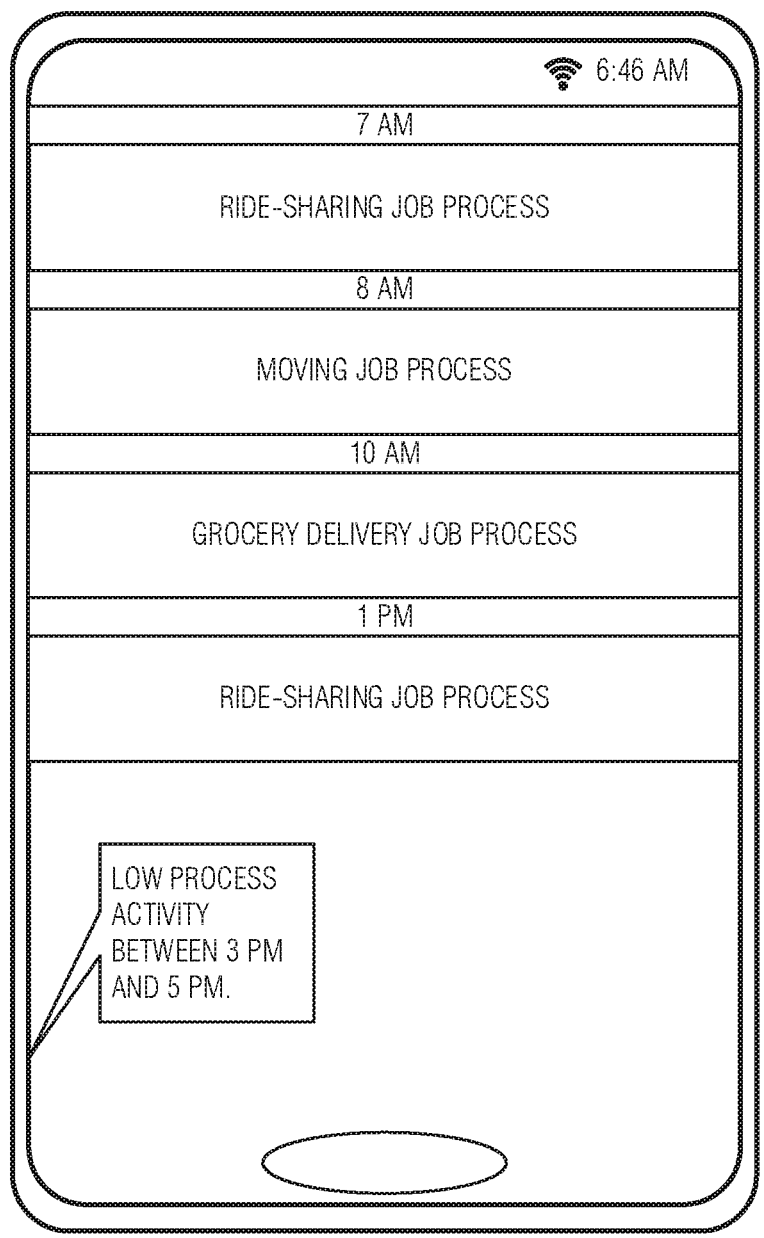
FIG. 3 illustrates an example of a user interface for displaying an optimized process schedule workflow for a goal optimized process scheduler, according to an embodiment.

FIG. 3 illustrates an example of a user interface 300 for displaying an optimized process schedule workflow for a goal optimized process scheduler, according to an embodiment. The user interface 300 may provide features as discussed in FIGS. 1 and 2. The user interface 300 may display an optimized process schedule workflow (e.g., as described in FIG. 1, etc.) that includes a list of tasks to be completed in order based on the evaluations of the processes against a goal. As shown, the processes may be arranged by time periods indicating when the processes should be completed. The user may tap, or otherwise select, a process from the list and the process may be initiated with a corresponding process engine. For example, clicking on a ride-sharing job process element may open an application that corresponds with the process and may activate (or otherwise accept) the process.

In an example, the user interface 300 may provide an indication of time periods when process activity volume is low. The indication may provide the user with a time period in which non-goal-based tasks (e.g., personal errands, etc.) may be completed. This may allow the user to maximize progress toward the goal by reducing non-goal-based activity during periods of high process activity.

Figure 4:
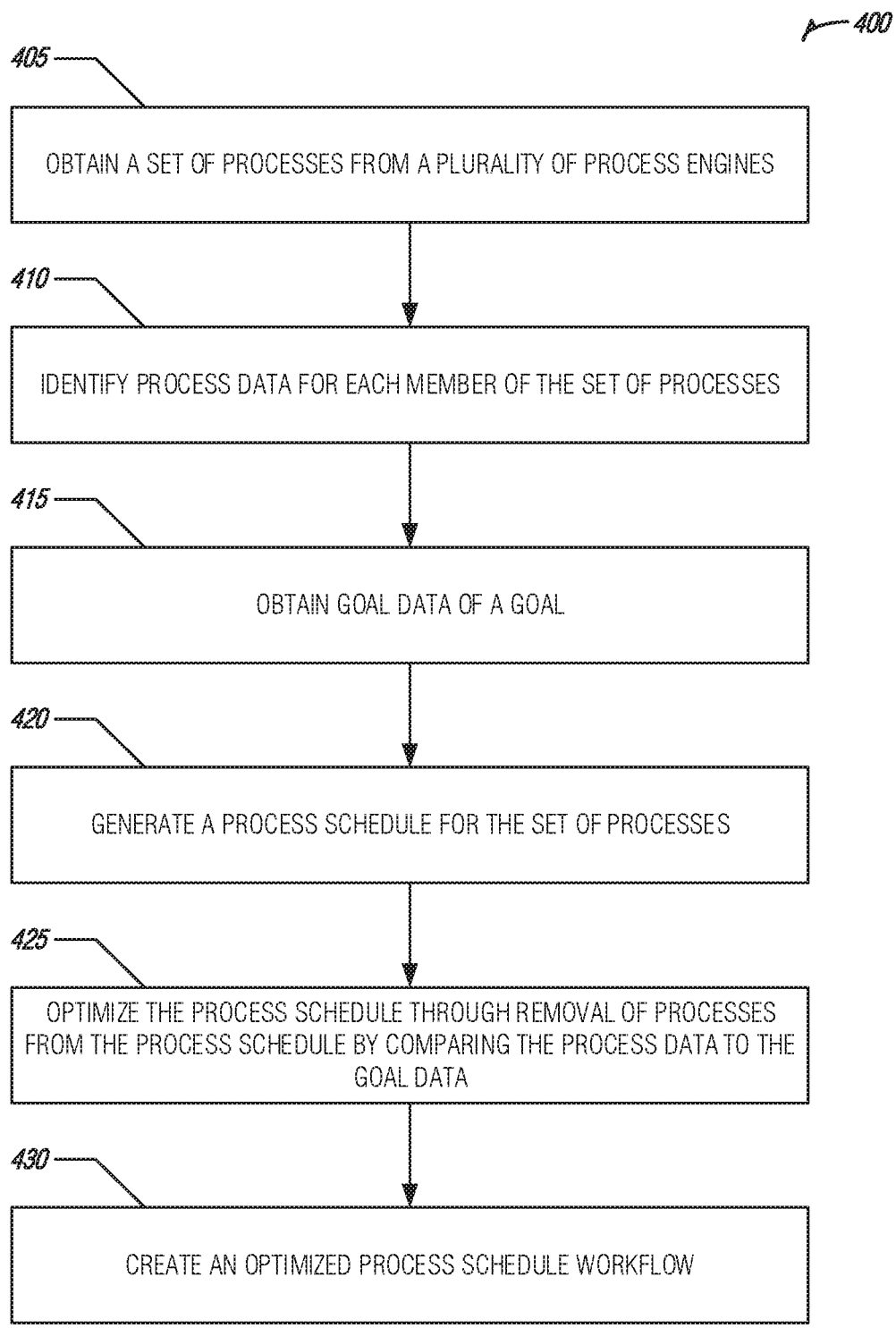
FIG. 4 illustrates an example of a method for a goal optimized process scheduler, according to an embodiment.

FIG. 4 illustrates an example of a method 400 for a goal optimized process scheduler, according to an embodiment. The method 400 may provide features as described in FIGS. 1 to 3.

A set of processes may be obtained (e.g., using the transceiver 120 as described in FIG. 1, etc.) from a plurality of process engines (e.g., job process engines 155 as described in FIG. 1, etc.) at operation 405.

Process data may be identified (e.g., by the comparator 125 as described in FIG. 1, etc.) for each member of the set of processes at operation 410.

Goal data of a goal may be obtained (e.g., by the comparator 125 as described in FIG. 1, etc.) at operation 415. The goal data may indicate elements for attainment of the goal by completion of one or more processes of the set of processes.

A processes schedule may be generated (e.g., by the process scheduler 130 as described in FIG. 1, etc.) for the set of processes at operation 420.

The process schedule may be optimized (e.g., by the process schedule optimizer 135 as described in FIG. 1, etc.) through removal of processes from the process schedule by comparing (e.g., by the comparator 125 as described in FIG. 1, etc.) the process data to the goal data at operation 425. The optimized process schedule may include a linear organization of processes for attaining the goal.

An optimized process schedule workflow may be created (e.g., by the output generator 140 as described in FIG. 1, etc.) for display on a user interface of a computing device at operation 430. In an example, the optimized process schedule workflow may include instructions for initiation of a selected process with its respective process engine upon selection of a user interface element that corresponds to the selected process.

In an example, a set of optimized process schedules that includes the optimized process schedule may be evaluated (e.g., by the comparator 125 as described in FIG. 1, etc.) to identify a common period of reduced process activity and an indication of the period of reduced process activity may be transmitted to a computing device of a user.

In another example, progress towards completing a current process may be identified (e.g., by the comparator 125 as described in FIG. 1, etc.). An indication of a new process may be received from a process engine of the plurality of process engines. The process schedule may be re-optimized (e.g., by the process schedule optimizer 135 as described in FIG. 1, etc.) upon a determination that, based on evaluation of process data for the new process and the goal data (e.g., by the comparator 125 as described in FIG. 1, etc.), that the new process is a better fit for attaining the goal than an existing process remaining in the linear organization of processes remaining to be completed. A re-optimized process schedule workflow may be displayed in the user interface based on the re-optimized process schedule.

In another example, a process completion value may be identified for members of the set of processes using the process data and a goal value may be determined for the goal using the goal data. Optimization of the processes schedule may include an evaluation of the process completion value for the members against the goal value. In another example, a process location may be identified for members of the set of processes using the process data and optimization of the processes schedule may include evaluation of the process location for the members. The optimized process schedule workflow may include processes of the optimized process schedule arranged on a map display with a route that indicates the order in which the process are to be completed.

In another example, a pattern may be identified for a member of the plurality of process engines. The pattern for the member may be evaluated against the goal value and a weight value may be assigned to a process of the set of process that corresponds to the member based on the evaluation. The optimization of the processes schedule may include evaluation of the weight of the process against weights of other process of the set of processes. In another example, a user activity of a user of the computing device may be identified and optimization of the processes schedule may include evaluation of the user activity against the goal value.

Figure 5:
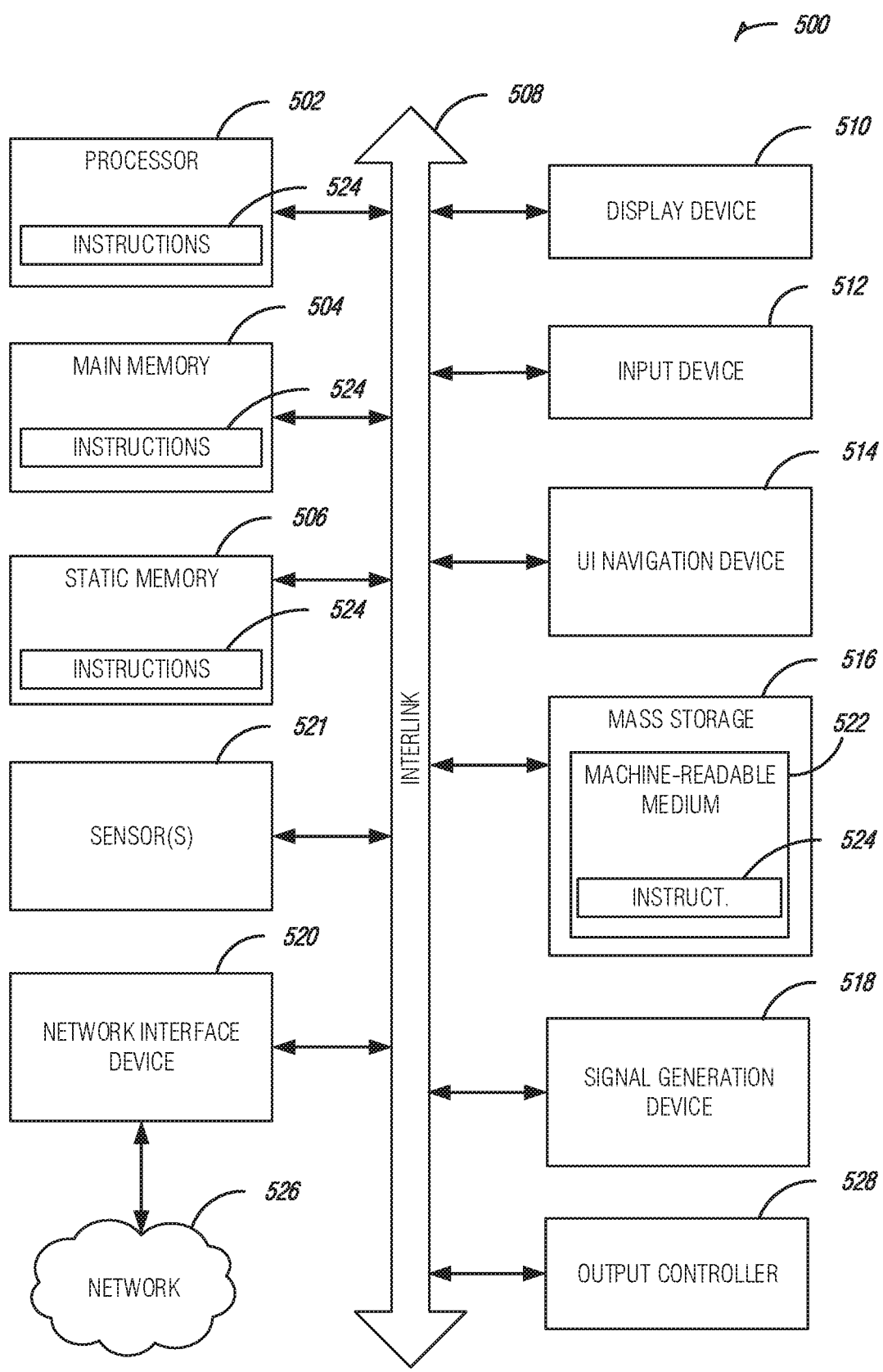
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for an optimized goal-based process scheduler, the system comprising:

at least one processor; and memory including instructions that, when executed by the at least one processor, cause the at least one processor to perform operations to:

establish a connection to a plurality of third-party process engines via respective Application Programming Interface (API) calls, wherein each process engine is a task scheduler for a respective task-based job service;

obtain a set of processes from the plurality of third-party process engines using the respective API calls, each process of the set of processes relating to a corresponding task to be completed;

identify process data for each member of the set of processes;

obtain goal data for a goal, wherein the goal data indicates elements for attainment of the goal by completion of one or more processes of the set of processes;

generate a process schedule for the set of processes based on the goal data;

optimize the process schedule through replacement of a first process with a second process in the process schedule by comparison of first process data of the first process and second process data of the second process to the goal data, wherein the optimized process schedule includes a linear organization of processes for attainment of the goal;

create, for display on a user interface of a computing device, an optimized process schedule workflow based on the optimized process schedule, the optimized process schedule workflow providing a set of tasks to be completed by a user to progress toward attainment of the goal; and transmit instructions to the computing device to display applications corresponding to each process engine of the plurality of third-party process engines based on the optimized process schedule, wherein a first application corresponding to a first process in the optimized process schedule is activated for display upon receipt of the instructions.

2. The system of claim 1, wherein the optimized process schedule workflow includes instructions for initiation of a selected process with its respective process engine upon selection of a user interface element that corresponds to the selected process.

3. The system of claim 1, further comprising instructions to:

evaluate a set of optimized process schedules that includes the optimized process schedule to identify a common period of reduced process activity; and transmit an indication of the period of reduced process activity to a computing device of a user.

4. The system of claim 1, further comprising instructions to:

identify progress towards completion a current process;

receive an indication of a new process from a process engine of the plurality of third-party process engines;

re-optimize the process schedule upon determination, based on evaluation of process data for the new process and the goal data, that the new process is a better fit for attainment of the goal than an existing process that remains in the linear organization of processes that remain to be completed; and display, in the user interface, a re-optimized process schedule workflow based on the re-optimized process schedule.

5. The system of claim 1, further comprising instructions to:

identify a process completion value for members of the set of processes using the process data; and determine a goal value for the goal using the goal data, wherein the instructions to optimize the processes schedule include instructions to evaluate the process completion value for the members against the goal value.

6. The system of claim 1, further comprising instructions to:

identify a process location for members of the set of processes using the process data, wherein the instructions to optimize the processes schedule include instructions to evaluate the process location for the members, and wherein the optimized process schedule workflow includes processes of the optimized process schedule arranged on a map display with a route that indicates an order in which the processes are to be completed.

7. The system of claim 1, further comprising instructions to:

determine a pattern for a member of the plurality of third-party process engines;

evaluate the pattern for the member against L goal value; and assign a weight value to a process of the set of processes that corresponds to the member based on the evaluation, wherein the instructions to optimize the processes schedule include instructions to evaluate the weight of the process against weights of other process of the set of processes.

8. The system of claim 1, further comprising instructions to:

identify a user activity of a user of the computing device, wherein the instructions to optimize the processes schedule include instructions to evaluate the user activity against a goal value.

9. At least one non-transitory computer readable medium including instructions for an optimized goal-based process scheduler that, when executed by at least one processor, cause the at least one processor to perform operations to:

establish a connection to a plurality of third-party process engines via respective Application Programming Interface (API) calls, wherein each process engine is a task scheduler for a respective task-based job service;

obtain a set of processes from the plurality of third-party process engines using the respective API calls, each process of the set of processes relating to a corresponding task to be completed;

identify process data for each member of the set of processes;

obtain goal data for a goal, wherein the goal data indicates elements for attainment of the goal by completion of one or more processes of the set of processes;

generate a process schedule for the set of processes based on the goal data;

optimize the process schedule through replacement of a first process with a second process in the process schedule by comparison of first process data of the first process and second process data of the second process to the goal data, wherein the optimized process schedule includes a linear organization of processes for attainment of the goal;

create, for display on a user interface of a computing device, an optimized process schedule workflow based on the optimized process schedule, the optimized process schedule workflow providing a set of tasks to be completed by a user to progress toward attainment of the goal; and transmit instructions to the computing device to display applications corresponding to each process engine of the plurality of third-party process engines based on the optimized process schedule, wherein a first application corresponding to a first process in the optimized process schedule is activated for display upon receipt of the instructions.

10. The at least one computer readable medium of claim 9, wherein the optimized process schedule workflow includes instructions for initiation of a selected process with its respective process engine upon selection of a user interface element that corresponds to the selected process.

11. The at least one computer readable medium of claim 9, further comprising instructions to:

evaluate a set of optimized process schedules that includes the optimized process schedule to identify a common period of reduced process activity; and transmit an indication of the period of reduced process activity to a computing device of a user.

12. The at least one computer readable medium of claim 9, further comprising instructions to:

identify progress towards completion a current process;

receive an indication of a new process from a process engine of the plurality of third-party process engines;

re-optimize the process schedule upon determination, based on evaluation of process data for the new process and the goal data, that the new process is a better fit for attainment of the goal than an existing process that remains in the linear organization of processes that remain to be completed; and display, in the user interface, a re-optimized process schedule workflow based on the re-optimized process schedule.

13. The at least one computer readable medium of claim 9, further comprising instructions to:

identify a process completion value for members of the set of processes using the process data; and determine a goal value for the goal using the goal data, wherein the instructions to optimize the processes schedule include instructions to evaluate the process completion value for the members against the goal value.

14. The at least one computer readable medium of claim 9, further comprising instructions to:

identify a process location for members of the set of processes using the process data, wherein the instructions to optimize the processes schedule include instructions to evaluate the process location for the members, and wherein the optimized process schedule workflow includes processes of the optimized process schedule arranged on a map display with a route that indicates an order in which the processes are to be completed.

15. The at least one computer readable medium of claim 9, further comprising instructions to:
determine a pattern for a member of the plurality of third-party process engines;
evaluate the pattern for the member against a goal value; and
assign a weight value to a process of the set of processes that corresponds to the member based on the evaluation, wherein the instructions to optimize the processes schedule include instructions to evaluate the weight of the process against weights of other process of the set of processes.

16. The at least one computer readable medium of claim 9, further comprising instructions to:
identify a user activity of a user of the computing device, wherein the instructions to optimize the processes schedule include instructions to evaluate the user activity against a goal value.

17. A method for optimizing a process scheduler for a goal, the method comprising:
establishing a connection to a plurality of third-party process engines via respective Application Programming Interface (API) calls, wherein each process engine is a task scheduler for a respective task-based job service;
obtaining a set of processes from the plurality of third-party process engines using the respective API calls, each process of the set of processes relating to a corresponding task to be completed;
identifying process data for each member of the set of processes;
obtaining, from a computing device, goal data of the goal, the goal data indicating elements for attaining the goal by completion of one or more processes of the set of processes;
generating a process schedule for the set of processes based on the goal data;
optimizing the process schedule by replacement of a first process with a second process in the process schedule by comparing first process data of the first process and second process data of the second process to the goal data, wherein the optimized process schedule includes a linear organization of processes for attaining the goal;
creating, for display on a user interface of the computing device, an optimized process schedule workflow based on the optimized process schedule, the optimized process schedule workflow providing a set of tasks to be completed by a user to progress toward attainment of the goal; and
transmitting instructions to the computing device to display applications corresponding to each process engine of the plurality of third-party process engines based on the optimized process schedule, wherein a first application corresponding to a first process in the optimized process schedule is activated for display upon receipt of the instructions.

18. The method of claim 17, wherein the optimized process schedule workflow includes instructions for initiating a selected process with its respective process engine upon selection of a user interface element corresponding to the selected process.

19. The method of claim 17, further comprising:
evaluating a set of optimized process schedules including the optimized process schedule to identify a common period of reduced process activity; and
transmitting an indication of the period of reduced process activity to a computing device of a user.

20. The method of claim 17, further comprising:
identifying progress towards completing a current process;
receiving an indication of a new process from a process engine of the plurality of third-party process engines;
re-optimizing the process schedule upon determining, based on evaluation of process data for the new process and the goal data, that the new process is a better fit for attaining the goal than an existing process remaining in the linear organization of processes remaining to be completed; and
displaying, in the user interface, a re-optimized process schedule workflow based on the re-optimized process schedule.

21. The method of claim 17, further comprising:
identifying a process completion value for members of the set of processes using the process data; and
determining a goal value for the goal using the goal data, wherein optimizing the processes schedule includes evaluating the process completion value for the members against the goal value.

22. The method of claim 17, further comprising:
identifying a process location for members of the set of processes using the process data, wherein optimizing the processes schedule includes evaluating the process location for the members, and wherein the optimized process schedule workflow includes processes of the optimized process schedule arranged on a map display with a route indicating an order in which the processes are to be completed.

23. The method of claim 17, further comprising:
determining a pattern for a member of the plurality of third-party process engines;
evaluating the pattern for the member against a goal value; and
assigning a weight value to a process of the set of processes that corresponds to the member based on the evaluation, wherein optimizing the processes schedule includes evaluating the weight of the process against weights of other process of the set of processes.

24. The method of claim 17, further comprising:
identifying a user activity of a user of the computing device, wherein optimizing the processes schedule includes evaluating the user activity against a goal value.

* * * * *

UNITED STATES PATENT AND TRADEMARK OFFICE
CERTIFICATE OF CORRECTION

PATENT NO. : 10,832,185 B1
APPLICATION NO. : 15/867081
DATED : November 10, 2020
INVENTOR(S) : Bricklin et al.

Page 1 of 1

It is certified that error appears in the above-identified patent and that said Letters Patent is hereby corrected as shown below:

In the Claims

In Column 13, Line 37, in Claim 7, delete "L" and insert --a-- therefor

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*